UNITED STATES PATENT OFFICE 2,606,923

TERTIARY ALKYLCYANAMIDES

Newman M. Bortnick, Philadelphia, Pa., assignor to Rohm & Haas Company, Philadelphia, Pa., a corporation of Delaware No Drawing. Application May 13, 1950, Serial No. 161,899

6 Claims. (Cl. 260—551)

This invention relates to a new class of alkylcyanamides; namely, tertiary-alkylcyanamides, and to a novel method of preparing them.

I have found that these tertiary-alkylcyanamides are surprisingly stable as compared to other alkylcyanamides known heretofore and that this greater stability results from the particular structure of the cyanamides. Because the compounds are so stable, they can be readily purified, for example by distillation. They are capable of undergoing a wide variety of chemical reactions to produce in turn other new compounds, and because they are stable and do not undergo decomposition or cyclization like alkylcyanamides known heretofore the yields of the resultant products are unusually high. Thus, for example, they react with dicyandiamide to produce substituted melamines readily and efficiently. They are insoluble in water or in acidic aqueous solution but are soluble in solutions of strong bases and in this respect they form salts and behave like very weak acids. Their stability is indicated by the fact that they can be distilled under reduced pressures to temperatures at least as high as 200° C.

All of the products of this invention contain the molecular configuration:

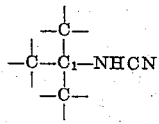

wherein $C_1$ is a tertiary carbon atom connected to three other carbon atoms. The products may also be represented by the following general formula:

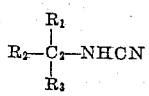

in which $R_1$, $R_2$, and $R_3$ are alkyl groups such as the following groups: Methyl, ethyl, isopropyl, n-butyl, isobutyl, tert.-butyl, sec.-amyl, 2-ethylhexyl, lauryl, hexadecyl groups and all isomers of these groups. This invention also includes the cyanamides of the above general formula wherein $R_1$ and $R_2$ taken together with the tertiary carbon atom, $C_1$, represent an aliphatic, cyclic radical, to one and the same carbon atom of which are attached both the cyanamide group, NHCN, and the alkyl group, $R_3$. That is to say, $R_1$ and $R_2$, in addition to representing individual alkyl groups, when taken together also represent an alkylene group, preferably of polymethylene group, the terminal carbon atoms of which alkylene group are both attached to the tertiary carbon atom, $C_1$, which also carries the alkyl group, $R_3$, and is attached to the cyanamide group, —NHCN. Examples of such alicyclic cyanamides are the following:

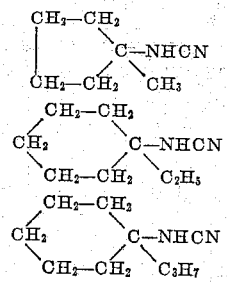

The smallest aliphatic radical represented by the characters $R_1$, $R_2$, and $R_3$ above is, of course, the methyl group and the largest is the hexadecyl group since this invention is limited to those cyanamides which can be made commercially and in which the total number of carbon atoms in the three R-groups is from three, as in the case of tertiary-butylcyanamide, to eighteen as in the case, for example, of ethyldioctylcarbinylcyanamide,

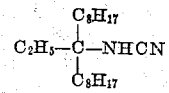

The tertiary-alkylcyanamides of this invention can be prepared by several methods from tertiary-alkylamines having the general formula:

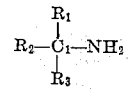

in which the characters $R_1$, $R_2$, $R_3$, and $C_1$ have the same significance as is described above. Thus, for example, these amines react directly with cyanogen chloride to produce the new tertiary-alkylcyanamides of this invention, or the amines react with a tertitary-alkyl hypochlorite to form the compound

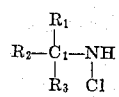

which is then reacted with sodium cyanide to form the tertiary - alkylcyanamide. Alternatively, a mixture of the amine and hydrogen cyanide is treated first with chlorine and then with sodium hydroxide or simultaneously with chlorine and sodium hydroxide. Still another method which is simple—yet novel—and which cannot be used with ordinary amines such as dimethylamine comprises agitating an aqueous mixture of a tertiary-alkylamine, sodium hydroxide, and sodium cyanide while chlorine is passed simultaneously into the mixture and thereafter separating the tertiary-alkylcyanamide from the reaction mixture.

In this last process of manufacture the reaction takes the following course:

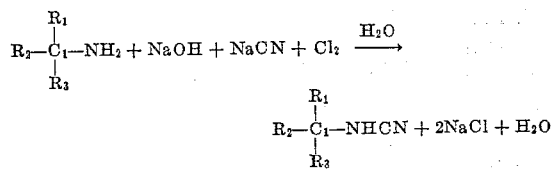

It is a particularly efficient process for producing the cyanamides inasmuch as a minimum of equipment is required and inexpensive reactants and conditions are employed. The reaction can be run at temperatures from about the freezing point of the aqueous mixture (about −20° C.) up to about 80° C. There does not appear to be any advantage in going above about 80° C. and, for general convenience in operating, a temperature range of from about −10° C. to about 50° C. is much preferred, particularly since high yields are obtained under these conditions. The reaction proceeds readily and efficiently at atmospheric pressure and, although super-atmospheric pressures have been used, there is no marked advantage in so doing. Obviously other strong bases can be used in place of the sodium hydroxide. The term "strong base" is used in its accepted sense to describe a compound which yields a high concentration of hydroxyl groups in aqueous solution, such as one whose 0.1N aqueous solution has a pH of 11 to 13 at 25° C. Thus, potassium hydroxide or quaternary ammonium hydroxides are equally satisfactory. Likewise any other water-soluble inorganic cyanide salt can be used, as for example potassium cyanide or lithium cyanide. It is evident that the reactants combine in equimolar amounts but it is also a fact that an excess of any one can be used if desired, especially since the cyanamide which is formed separates from the aqueous phase. Of special importance is the fact that these tertiary-alkylcyanamides which are formed do not react with the starting amine, as is the case with other cyanamides, such as dimethyl or monocyclohexyl cyanamides, to form by-products.

The following examples serve to illustrate the new tertiary-alkylcyanamides and their preparation. It is to be noted that so long as the groups shown as $R_1$, $R_2$, and $R_3$ in the above general formulas for the tertiary-alkylamines are alkyl groups or cycloaliphatic groups, as explained, they are not affected by the reaction and remain intact, so that, as a result, the cyanamides which are produced have the same substituents, $R_1$, $R_2$, and $R_3$, as the amine from which they are made.

Example 1

Into a reaction flask equipped with thermometer, mechanical stirrer, gas inlet tube and condenser were charged 73 parts of tert.-butylamine, $(CH_3)_3C-NH_2$, 50 parts of sodium cyanide, 80 parts of a 50% aqueous solution of sodium hydroxide, and 200 parts of water. Into the stirred mixture was passed 71 parts of chlorine over a period of 30 minutes while the temperature was maintained below 40° C. by means of an ice-bath. The reaction mixture was then held at 40° C. for 45 minutes after which the agitation was stopped and the organic and aqueous layers were separated. The organic layer was washed with water and was fractionally distilled under reduced pressure. The main fraction boiling at 113° C. and 13 mm. of pressure (Hg) amounted to 46.4 parts. This product, a liquid, was soluble in acetone, ethyl alcohol, and in a dilute solution of sodium hydroxide, but it separated as a liquid layer when the alkaline solution was neutralized and slightly acidified with glacial acetic acid. Analysis corresponded to that calculated for tertiary-butylcyanamide, $(CH_3)_3-C-NHCN$.

Example 2

The procedure of Example 1 was followed with one exception; namely, that the reaction mixture was held at 0° C. by means of an ice-bath during the addition of chlorine. In this case the yield was 35.6 parts. A careful redistillation of the product showed it to have a boiling point of 112–113° C. at 12 mm. of pressure (Hg) and the analysis again confirmed its composition to be tert.-butylcyanamide.

Example 3

The procedure of Example 2 was followed with one exception; namely, that 129 parts of dimethylneopentylcarbinylamine, $$(CH_3)_3-C-CH_2-C(CH_3)_2-NH_2$$

was used in place of the tert.-butylamine of Example 2. The product in this case was a liquid which boiled at 145–147° C. and 10 mm. pressure. It was insoluble in water or acidic, aqueous solutions but dissolved in a dilute aqueous solution of sodium hydroxide. The following structure of this product, dimethylneopentylcarbinylcyanamide, was confirmed by analysis:

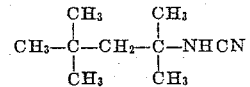

Example 4

Into a reaction flask equipped with thermometer, mechanical stirrer, dropping funnel, and condenser was charged 185 parts of tert.-tridecylamine (isooctyldiethylcarbinylamine). This was stirred and while the temperature was maintained at 35–40° C. there was added slowly 108.5 parts of tert.-butyl hypochlorite. Then a solution of 50 parts of sodium cyanide in 100 parts of water was added dropwise while the temperature of the reaction mixture was held at 35–40° C. After the addition of the sodium cyanide, the flask and contents were held at room temperature overnight after which the organic layer was separated, washed with water, and then fractionally distilled under reduced pressure. The main fraction, equal to 96.2 parts, boiled at 145–155° C. under 1.5 mm. of pressure (Hg). The product was soluble in aqueous sodium hydroxide solution and in methanol but was insoluble in water or acidic solutions. The analysis of the redistilled product corresponded to that of tert.-tridecylcyanamide:

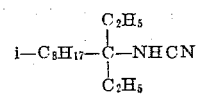

Example 5

The procedure of Example 1 was followed with the exception that 203 parts of tert.-tridecylamine (isooctyldiethylcarbinylamine) was employed instead of the tert.-butylamine of the first example. When all of the chlorine had been added, an exothermic reaction took place which carried the temperature to 78° C. despite the use of an ice-bath. After the mixture had cooled to room temperature the organic layer was separated, washed and fractionally distilled. The fraction boiling at 145–155° C. and 1 mm. of pressure (124 parts) represented a 68% yield on the weight of the amine which was consumed. This product was identical with the compound produced in Example 4 and analysis showed it to contain 12.4% nitrogen (calculated value is 12.5%).

Example 6

Into a flask equipped with stirrer, thermometer, condenser, and dropping funnel was charged 108.5 parts of tert.-butyl hypochlorite. Twenty-seven parts of liquid hydrogen cyanide was slowly added while the temperature was maintained below 0° C. Then 258 parts of dimethylneopentylcarbinylamine was added dropwise while the temperature was held below 10° C. The reaction mixture thickened to such an extent that it was necessary to add 100 cc. of toluene in order to facilitate stirring. The mixture was held below 0° C. for one hour and then for 45 minutes at room temperature after which it was filtered in order to remove dimethylneopentylcarbinylamine hydrochloride. The filtrate was fractionally distilled under reduced pressure and a 69% yield (based on consumed amine) of product boiling at 145–149° C. and 10 mm. of pressure was obtained. This product was identical with that obtained by the process of Example 3 above.

Example 7

The procedure of Example 6 was followed with the exception that only 130 parts of dimethylneopentylcarbinylamine was added. Following the addition of this amine there was added 200 parts of a 20% aqueous solution of sodium hydroxide over a period of one hour while the temperature was held below 10° C. The pH of the aqueous phase was then adjusted to 9.2 and the organic layer was separated and fractionally distilled under reduced pressure. A 69% yield of a product boiling at 145°–158° C. and 10 mm. of pressure was obtained. Redistillation of this material gave a product, boiling at 145° C./10 mm., which analysis showed to contain 18.2% nitrogen and which was identical with the product of Examples 3 and 6 above.

Example 8

The procedure of Example 7 was followed with the exception that in place of the amine of Example 7 there was used here 85 parts of 1,8-diamino-p-menthane. After the separation and distillation there was obtained a product which was soluble in alkaline solutions but insoluble in water or acidic solutions. The analysis confirmed it to be the following compound:

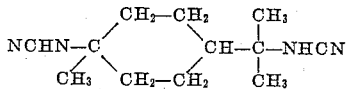

The tertiary-alkylamines from which the cyanamides are made can be prepared themselves for example by the reaction of olefins with hydrogen cyanide and sulfuric acid followed by controlled hydrolysis. The process described in Example 1 is particularly convenient to carry out and it has been used efficiently for the production of a wide variety of tertiary-alkylcyanamides, all of which are new and all of which fall within the scope of the description given above. These new cyanamides have a community of properties in that they are liquids, are surprisingly stable in comparison with alkylcyanamides known heretofore, and all react with dicyandiamide, unlike the older alkylcyanamides, to produce mono-N-substituted melamines as is shown in Example 9 below. Examples of specific cyanamides which have this community of properties and which are made from the corresponding tertiary-alkylamines in yields of 30% to about 80% by the processes discussed and exemplified above — especially the process of Example 1 — include the following: Isoheptyldiethylcarbinylcyanamide; isooctylethylpropylcarbinylcyanamide; methyldiethylcarbinylcyanamide; dimethylpropylcarbinylcyanamide; diisooctylethylcarbinylcyanamide; tert.-amylcyanamide; and 1-methylcyclohexylcyanamide.

The following example shows how one of these new tertiary-alkylcyanamides; namely, dimethylneopentylcarbinylcyanamide reacts with dicyandiamide to form mono-N-(tert.-octyl)-melamine. It is to be understood that the other tertiary-alkylcyanamides of this invention react in the same way as the dimethylneopentylcarbinylcyanamide of this example:

Example 9

A mixture of 38.5 parts of dimethylneopentylcarbinylcyanamide, 25 parts of dicyandiamide, 80 parts of n-propanol, and 1.4 parts of powdered potassium hydroxide was stirred and refluxed for two hours at which time 1.4 parts of potassium hydroxide was added and the reaction mixture was again refluxed for two more hours after which a third portion (1.4 parts) of powdered potassium hydroxide was added and the reaction continued for a final period of two hours. On cooling, a precipitate settled out of the reaction mixture and this material was filtered off, washed with hot water, and recrystallized from ethylene dichloride. A 68% yield of very pure product was obtained which had a melting point of 160–161° C. and which contained, on analysis, 35.4% nitrogen as against a calculated value of 35.3% nitrogen-content in the substituted melamine having this formula:

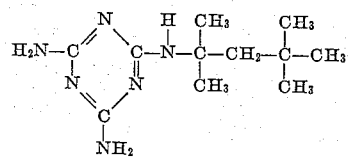

I claim:

1. New tertiary-alkylcyanamides having the general formula

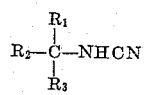

wherein $R_1$, $R_2$, and $R_3$ represent alkyl groups and in addition to representing individual alkyl groups $R_1$ and $R_2$ taken toghether with the tertiary carbon atom represent a saturated, unsubstituted cycloaliphatic radical which carries the alkyl-substituent, $R_3$, on the same carbon atom which is joined to the cyanamide group, —NHCN, the total number of carbon atoms in the group represented by $R_1$, $R_2$, and $R_3$ totalling three to eighteen.

2. New tertiary-alkylcyanamides having the general formula

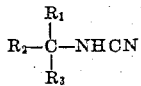

herein $R_1$, $R_2$, and $R_3$ represent alkyl groups of which the total number of carbon atoms is three to eighteen.

3. As a new composition of matter, the alkylcyanamide having the formula

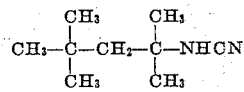

4. As a new composition of matter, the alkylcyanamide having the formula

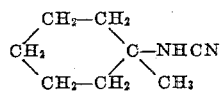

5. As a new composition of matter, the alkylcyanamide having the formula $$CH_3-\underset{\underset{CH_3}{|}}{\overset{\overset{CH_3}{|}}{C}}-NHCN$$

6. As a new composition of matter, the alkylcyanamide having the formula

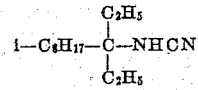

NEWMAN M. BORTNICK.

REFERENCES CITED

The following references are of record in the file of this patent:

UNITED STATES PATENTS

| Number | Name | Date |
|---|---|---|
| 2,331,670 | Ericks et al. | Oct. 12, 1943 |

FOREIGN PATENTS

| Number | Country | Date |
|---|---|---|
| 607,720 | Great Britain | Sept. 3, 1948 |